United States Patent
Pike et al.

(10) Patent No.: US 9,676,668 B2
(45) Date of Patent: Jun. 13, 2017

(54) DRY MIX FOR COMPOSITE CEMENT

(71) Applicant: Redi-Mix, LLC, Euless, TX (US)

(72) Inventors: Clinton Wesley Pike, Montgomery, TX (US); Gerald Thomas Gaubert, Jr., Carrollton, TX (US); Armando Perez Barcenas, Richmond, TX (US)

(73) Assignee: REDI-MIX, LLC, Dallas, TX (US)

( * ) Notice: Subject to any disclaimer, the term of this patent is extended or adjusted under 35 U.S.C. 154(b) by 0 days.

(21) Appl. No.: 14/409,001

(22) PCT Filed: Jun. 28, 2013

(86) PCT No.: PCT/US2013/048401
§ 371 (c)(1),
(2) Date: Dec. 18, 2014

(87) PCT Pub. No.: WO2014/004943
PCT Pub. Date: Jan. 3, 2014

(65) Prior Publication Data
US 2015/0183689 A1   Jul. 2, 2015

Related U.S. Application Data

(60) Provisional application No. 61/665,626, filed on Jun. 28, 2012.

(51) Int. Cl.
*C04B 7/32*   (2006.01)
*C04B 28/06*   (2006.01)

(52) U.S. Cl.
CPC .............. *C04B 28/06* (2013.01); *C04B 7/32* (2013.01); *Y02W 30/92* (2015.05)

(58) Field of Classification Search
USPC ...................................................... 106/692
See application file for complete search history.

(56) References Cited

U.S. PATENT DOCUMENTS

| | | | | |
|---|---|---|---|---|
| 5,573,589 A | * | 11/1996 | Tanaka | C04B 24/168 106/729 |
| 5,997,632 A | * | 12/1999 | Styron | C04B 28/021 106/705 |
| 6,641,658 B1 | * | 11/2003 | Dubey | C04B 28/16 106/695 |
| 2004/0040474 A1 | * | 3/2004 | Perez-Pena | C04B 28/04 106/808 |
| 2005/0241537 A1 | * | 11/2005 | Hicks | C04B 18/08 106/705 |
| 2008/0066654 A1 | * | 3/2008 | Fraser | C04B 28/04 106/709 |
| 2013/0118381 A1 | * | 5/2013 | Frenkenberger | C04B 24/32 106/695 |

FOREIGN PATENT DOCUMENTS

| | | | | |
|---|---|---|---|---|
| CN | WO 2009016230 A2 | * | 2/2009 | ........... C04B 22/008 |
| DE | WO 2011110509 A1 | * | 9/2011 | ............. C04B 24/32 |

OTHER PUBLICATIONS

Dewilter, Rachel. "The Role of Fly Ash Composition in Reducing Alkali-Silica Reaction". Portland Cement Association. 1997. Retrieved from http://www.cement.org/docs/default-source/fc_concrete_technology/durability/sn2092-the-role-of-fly-ash-composition-in-reducing-alkali-silica-reaction.pdf?sfvrsn=4.*
"Class C Fly Ash". PSU. Sep. 10, 2006. Retrieved from https://web.archive.org/web/20060910000955/http://www.engr.psu.edu/ce/courses/ce584/concrete/library/materials/Altmaterials/Class%20C%20Fly%20Ash.htm.*

* cited by examiner

*Primary Examiner* — Jennifer A Smith
*Assistant Examiner* — Karam Hijji
(74) *Attorney, Agent, or Firm* — Haynes & Boone, LLP

(57) ABSTRACT

A dry mix for a composite cement is described. The dry mix includes a calcium-containing material, an aluminum-containing material, a lithium-containing accelerant, a retarder, and a pozzolanic additive that contains a soluble sulfur salt. The pozzolanic additive preferably includes a soluble sulfur salt at a fraction greater than approximately 0.2% by weight. The pozzolanic additive may be a fly ash, and is preferably a class C fly ash. A powdered additive for use with a pre-prepared dry mix for a calcium aluminate cement is also described. The powdered additive includes a lithium-containing accelerant, a retarder, and a pozzolanic additive that contains a soluble sulfur salt.

4 Claims, No Drawings

DRY MIX FOR COMPOSITE CEMENT

FIELD OF THE INVENTION

The invention relates to a dry mix for a composite cement and, more particularly, to a dry mix for a calcium aluminate composite cement.

BACKGROUND TO THE INVENTION

Calcium aluminate cements are produced by reaction of a calcium-containing material, typically limestone, with an aluminum-containing material, such as bauxite, to produce calcium aluminate. A typical calcium aluminate cement contains multiple phases of calcium aluminate, of which the main active phase is the hexagonal phase monocalcium aluminate ($CaAl_2O_4$ or $CaO.Al_2O_3$).

It is a well-documented problem that this hexagonal monocalcium aluminate is a metastable phase, which, in the presence of moisture, undergoes complex hydration reactions over long timescales to form the stable cubic phase hydrogarnet ($CaO_3.Al_2O_3.6H_2O$). This process is known in the art as 'conversion'. The stable hydrogarnet phase is of greater density than the monocalcium aluminate phase; conversion of a calcium aluminate cement therefore results in an increase in porosity, and consequently a decrease in strength over time. In extreme cases, structures including calcium aluminate cements can collapse after several years due to strength loss resulting from conversion.

The conversion process has been the subject of extensive study over several decades, but attempts to address fully the problems that it raises have so far proved unsuccessful.

One way of managing the problem of decreasing strength due to conversion is to allow for the expected strength drop when designing a structure. The strength drop that can be expected to result from conversion can be predicted by testing and comparing the strength of converted and as-cast cement or concrete samples. For example, by exposing samples to a temperature above 140° F. (60° C.) the conversion rate can be accelerated such that samples will typically be fully converted within 24 hours (that is, all of the monocalcium aluminate has transformed to hydrogarnet). The strength of these fully-converted samples can be compared to that of as-cast samples to determine the expected strength drop over the life of the structure. Armed with this knowledge, engineers can ensure that the concrete will be of sufficient strength for its structural application even once conversion has occurred over the life of the product. However, in practice, the strength drop due to conversion can be unpredictable, making this approach unsuitable for many applications.

Alternatively, the problem of strength reduction can be mitigated to some extent by taking steps to minimise conversion of the cement to the hydrogarnet phase, for example by using a low water to dry mix ratio to reduce the water available for the conversion reaction, and/or by using concrete having a high cement content. However, the high cement content means that the resulting concrete is costly in comparison to alternative concretes of similar strength. Use of calcium aluminate cements in this context is therefore restricted to niche applications where properties such as rapid strength development, high-temperature strength or good chemical resistance are required.

There have also been attempts to prevent the conversion of calcium aluminate cements entirely by adding pozzolanic materials. For example, "The hydration of mixtures of monocalcium aluminate and blastfurnace slag" by Edmonds et al., published in Cement and Concrete Research, issue 19, p. 779 in 1989, describes a method for minimising conversion of a calcium aluminate cement in which half of the dry cement mix is replaced with granulated blast furnace slag. It is thought that the presence of the granulated blast furnace slag suppresses conversion by encouraging formation of stratlingite instead of hydrogarnet. "The influence of pozzolanic materials on the mechanical stability of aluminous cement" by Collepardi et al., published in Cement and Concrete Research Volume 25, Issue 5, p.961 in 1995 describes using alternative pozzolanic materials for the same purpose. Silica fume was found to be effective in reducing conversion, but fly ash was found to be ineffective.

Addition of pozzolanic materials to prevent conversion has several drawbacks. Firstly, the use of such large amounts of granulated blast furnace slag or other pozzolanic material reduces the strength of the cement, and secondly, some hydrogarnet is still formed. The inventors of the present invention have also observed that such cements display poor performance, particularly in cold weather. For example, working times are short, meaning that users have insufficient time to work with the cement prior to setting.

Finally, attempts have also been made to address the problem by preventing the initial formation of the metastable monocalcium aluminate, and instead forming the stable hydrogarnet and stratlingite phases directly as the cement sets. U.S. Pat. No. 4,605,443 to MacDowell, granted in 1986, describes a cement formed by fusing limestone, alumina and silica to form a glass, and then quenching the glass to produce stable hydrogarnet and stratlingite phases without intermediate metastable phases. However, production of this cement requires costly high-temperature processing due to the high melting points of the starting materials, making it unsuitable for many applications.

Despite many decades of research into conversion of calcium aluminate cements, a high-strength calcium aluminate cement that can be produced easily, that displays sufficiently long working times, and that sustains its high strength over long periods of time is not currently available. It is therefore an object of the present invention to provide such a cement, in which the problems found in the prior art are mitigated.

SUMMARY OF THE INVENTION

In developing the cement of the present invention, the inventors set out to produce an inexpensive calcium aluminate cement that has a high strength, that sets rapidly whilst having a long working time that is independent of temperature, and that undergoes negligible conversion.

In a first embodiment of the invention there is provided a dry mix for a composite cement including a calcium-containing material, an aluminum-containing material, a lithium-containing accelerant, a retarder, and a pozzolanic additive that contains a soluble sulfur salt.

A cement made from the dry mix of the invention demonstrates high strength, long working time, fast setting time and undergoes negligible conversion of monocalcium aluminate to hydrogarnet, thereby showing little strength drop over time. These properties are achieved only when the materials of the invention are provided in combination, because the materials interact and work in synergy to produce a cement having the desirable properties.

The lithium-containing accelerant forms $Li^+$ ions that catalyse the cementitious reaction. The soluble sulfate salts interact with the lithium containing accelerant, forming intermediate lithium compounds before forming the $Li^+$ ions. The formation of intermediate lithium compounds delays the formation of the Li$^+$ ions, slowing the initial rate of the cementitious reaction and thereby increasing the working time. The pozzolanic additive reduces the degree of conversion of the cement. Materials in the pozzolanic additive also take part in the cementitious reaction, and work together with the calcium-containing and aluminum-containing materials to increase the strength of the cement. Additionally, the retarder also acts as an activator for hydration of the pozzolanic additive, providing a cement-like product that contributes to the high strength.

So as to provide a cement having a long working time, the pozzolanic additive of preferably includes a soluble sulfur salt at a fraction greater than approximately 0.2% by weight. The pozzolanic additive may be a fly ash, and is preferably a class C fly ash. It is particularly surprising that fly ash can be used in view of the previously-mentioned document Collepardi et al. In a particularly preferred embodiment the fly ash naturally contains at least one soluble sulfur salt. Advantageously, the soluble sulfur salt that is naturally contained in some fly ashes is distributed on the outer surface of fly ash particles, providing a high solubility of the sulfate, and increasing working time of the cement.

So as to increase the initial strength of the cement, and decrease the amount of the cement that is converted from monocalcium aluminate to hydrogarnet, the pozzolanic additive may also contain soluble calcium. In a particularly preferred embodiment the pozzolanic additive contains soluble calcium at a fraction greater than approximately 1% by weight.

In the embodiment wherein the pozzolanic additive also contains soluble calcium, the soluble calcium acts in synergy with other components of the cement to increase the initial strength of the cement. The soluble calcium in the pozzolanic additive is easily dissolved in water, meaning that the water to dry mix ratio of the cement can be reduced, thereby increasing the strength. The soluble calcium also provides extra calcium ions for the cementitious reaction, resulting in an increased amount of calcium aluminate, further increasing the strength of the cement. Additionally, the soluble calcium is thought to encourage formation of the stable Stratlingite phase, thereby reducing the amount of the cement that can is converted form monocalcium aluminate to hydrogarnet.

To reduce cost further and to minimise conversion of the cement further, the dry mix preferably includes between approximately 25% and approximately 40% pozzolanic additive by weight. More preferably, the dry mix includes approximately 30% to 37% pozzolanic additive by weight.

In a preferred embodiment, the lithium-containing accelerant is one or more of the following or compounds: lithium carbonate, lithium sulfate and a lithium halide. Preferably, the lithium-containing accelerant is a lithium halide, and more preferably the lithium-containing accelerant is lithium chloride.

To reduce the cost of the cement whilst ensuring a fast setting time, the dry mix preferably includes between approximately 0.01% and approximately 0.1 lithium-containing accelerant by weight. In a particularly preferred embodiment, the dry mix includes between approximately 0.02% and approximately 0.04% lithium-containing accelerant by weight.

The retarder may, for example, be a carboxylic acid or a carboxylate. Preferably, the retarder is a polycarboxylate. To allow for easy mixing with the other components of the dry mix or the powdered additive, the retarder is a more preferably a dry powdered polycarboxylate. The dry mix preferably includes between approximately 0.1% and approximately 0.5% retarder by weight, and more preferably includes between approximately 0.2% and approximately 0.4 retarder by weight.

The invention also extends to a composite cement made from water and a dry mix including a calcium-containing material, an aluminum-containing material, a lithium-containing accelerant, a retarder, and a pozzolanic additive that contains a soluble sulfur salt. To increase strength and reduce conversion, the composite cement may have a water to dry mix ratio of less than approximately 0.4 to 1 by weight. Preferably the cement may have a water to dry mix ratio of less than approximately 0.35 to 1 by weight.

The invention further extends to a composite cement product including the composite cement, which may be, for example, a concrete, a mortar, or a thin-set binder.

The invention also resides in a powdered additive for use with a pre-prepared dry mix for a calcium aluminate cement, the powdered additive including a lithium-containing accelerant, a retarder, and a pozzolanic additive that contains a soluble sulfur salt.

So as to provide a cement having a long working time, the pozzolanic additive of the powdered additive preferably includes a soluble sulfur salt at a fraction greater than approximately 0.2% by weight. The pozzolanic additive may be a fly ash, and is preferably a class C fly ash.

So as to increase the initial strength of a cement made using the powdered additive, and to decrease the amount of the cement that is converted from monocalcium aluminate to hydrogarnet, the pozzolanic additive may also contain soluble calcium. In a particularly preferred embodiment the pozzolanic additive contains soluble calcium at a fraction greater than approximately 1% by weight.

To reduce cost and to minimise conversion of the cement, the powdered additive may include between approximately 97.6% and approximately 99.7 pozzolanic additive by weight. Preferably, the powdered additive includes approximately 98.2% to 99.5% pozzolanic additive by weight.

In a preferred embodiment of the powdered additive, the lithium-containing accelerant is one or more of the following or compounds: lithium carbonate, lithium sulfate and a lithium halide. Preferably, the lithium-containing accelerant is a lithium halide, and more preferably the lithium-containing accelerant is lithium chloride.

To reduce the cost of the cement whilst ensuring a fast setting time, the powdered additive preferably includes between approximately 0.02% and approximately 0.4% lithium-containing accelerant by weight. In a particularly preferred embodiment, the powdered additive includes between approximately 0.05% and approximately 0.16% lithium-containing accelerant by weight.

The retarder may, for example, be a carboxylic acid or a carboxylate. Preferably, the retarder is a polycarboxylate. To allow for easy mixing with the other components of the powdered additive, the retarder is a more preferably a dry powdered polycarboxylate. The powdered additive may include between approximately 0.25% and approximately 2.0% retarder by weight, and preferably includes between approximately 0.5% and approximately 1.6% retarder by weight.

The invention further extends to a dry mix for a concrete that includes sand and/or aggregates and a dry mix for a composite cement that includes a calcium-containing material, an aluminum-containing material, a lithium-containing accelerant, a retarder, and a pozzolanic additive that contains a soluble sulfur salt. Preferably, the dry mix for a concrete including between approximately 80 and approximately 95% sand and/or aggregates, and between approximately 5% and approximately 20% dry mix for a composite cement.

DETAILED DESCRIPTION OF THE INVENTION

Throughout this description, all parts and percentages expressed herein are parts and percentages by weight.

A dry-mix for a calcium aluminate cement includes a calcium-containing material, an aluminum-containing material, a pozzolanic additive that contains a soluble sulfur salt, a lithium-containing accelerating agent, and a retarder.

The calcium-containing and aluminum-containing materials may be any materials suitable for use in a dry mix for an calcium aluminate cement. The calcium-containing material and aluminum-containing material provide calcium and aluminum ions respectively that react to produce calcium aluminate in the basic cementitious reaction:

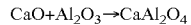

$$CaO + Al_2O_3 \rightarrow CaAl_2O_4$$

The calcium-containing material may be, for example, lime, and the aluminum-containing material may be, for example, bauxite. In a preferred embodiment, the calcium-containing and aluminum-containing materials are provided in powdered form. The aluminum-containing material and the calcium-containing material may be provided in a pre-mixed form, for example as a commercially available dry mix for a calcium aluminate cement, such as Ciment Fondu®.

The pozzolanic additive may be any pozzolanic additive that contains at least one soluble sulfur salt. The soluble sulfur salt may be, for example, a soluble sulfate or a soluble sulfite, or a mixture of both. In a preferred embodiment the pozzolanic additive naturally contains at least one soluble sulfur salt. For example, the pozzolanic additive can be a fly ash that naturally contains soluble sulfate or soluble sulfite. As is known in the art, fly ash is a residue generated by combustion of coal and is and is typically obtained from coal-fired power stations. Mineral matter that is burnt along with the coal contains soluble materials such sulfur and metals. These soluble materials are deposited onto the surface of the fly ash particles as the particles form, and as the particles are passed through a furnace. The soluble materials are distributed on the outer surfaces of the fly ash particles, and are easily dissolved when the fly ash is hydrated, making fly ash a particularly advantageous material for this application.

The exact nature and concentration of the soluble materials in the fly ash depends upon the nature of the mineral matter burned along with the coal. Thus, fly ash from each power station tends to have its own unique content of soluble materials such as sulfur salts and metals. For example, if sulfur is present in the mineral matter, sulfur gases are formed during combustion, and soluble sulfate and/or sulfite is formed as the sulfur gases condense on the surfaces of the fly ash particles.

In a particularly preferred embodiment, the pozzolanic additive is a class C fly ash that has a high fraction of soluble sulfur salts, for example greater than approximately 0.2%. As is known in the art, a class C fly ash contains more than approximately 20% calcium oxide and a minimum of approximately 50% aluminosilicate glass.

The presence of the pozzolanic additive reduces the extent of conversion of monocalcium aluminate to hydrogarnet in the calcium aluminate cement, by favouring formation of stratlingite over hydrogarnet.

In another preferred embodiment of the invention the pozzolanic additive contains soluble calcium in addition to a soluble sulfur salt. For example, the pozzolanic additive may be a fly ash that contains a soluble sulfur salt and soluble calcium. Soluble calcium is deposited on the outer surface of fly ash particles in the same way as soluble sulfate and sulfite, and is similarly easily dissolved when the fly ash is hydrated.

In a particularly advantageous embodiment of the invention, the fly ash is a class C fly ash having a high proportion of soluble calcium, for example a fly ash including greater than approximately 1% soluble calcium.

The proportion of pozzolanic additive in the dry mix may be between approximately 25% and approximately 40%. In a preferred embodiment, the proportion of pozzolanic additive in the dry mix is between approximately 30% and approximately 37%. This relatively high proportion of pozzolanic additive has the advantage of reducing the cost of the dry mix.

The lithium-containing accelerant may be any suitable lithium-containing material that accelerates the cementitious reaction. Typical lithium-containing accelerants are lithium carbonate, lithium sulfate or lithium halides such as lithium chloride. Such lithium-containing accelerants are known to act as accelerators for calcium aluminate cements, as lithium ions, formed by dissolution of the lithium-containing accelerants, act as a catalyst for the reaction between the calcium and aluminum ions. A particularly preferred lithium-containing accelerant is lithium chloride. The proportion of lithium-containing accelerant in the dry mix may be between approximately 0.01% and approximately 0.2%. In one preferred embodiment, the proportion of lithium-containing accelerant in the dry mix is between approximately 0.02% and approximately 0.04%. The surprisingly small proportion of accelerant required in this embodiment reduces the cost of the dry mix.

The retarder may be any material that reduces the rate of the cementitious reaction. For example, the retarder may be a weak organic acid, or a salt thereof. Particularly suitable retarders are carboxylic acids or carboxylate salts. Such retarders slow the cementitious reaction, for example by adsorbing onto the surface of the particles of the dry mix, causing electrostatic repulsion and steric hindrance. A particularly advantageous retarder is a dry powdered polycarboxylate. The dry mix may include between approximately 0.1% and approximately 0.5% retarder. In a preferred embodiment, the dry mix includes between approximately 0.2% and approximately 0.4% retarder.

Some retarders, such as carboxylates, are also known to act as water reducers. The same electrostatic forces and steric hindrance that slow the cementitious reaction between particles of the dry mix also cause the particles to disperse more easily and uniformly, thereby reducing the amount of water needed to achieve a given workability. Thus, in an embodiment where the retarder also acts as a water reducer, the presence of the retarder reduces the amount of water required in the cement.

An example of a dry mix for a composite cement in accordance with the present invention includes a calcium-containing material and an aluminum-containing material provided together in the form of Ciment Fondu® at a proportion of 69%, a pozzolanic additive in the form of a sulfur-salt containing class C fly ash at a proportion of 30.56%, a lithium containing accelerant in the form of lithium chloride at a proportion of 0.04%, and a retarder in the form of a polycarboxylate at a proportion of 0.4%.

The inventors have found that, surprisingly, when a dry mix containing these constituents is mixed with water to produce a cement, the constituents of the dry mix act in synergy, reacting with one another in complex and unexpected ways to produce a low-cost cement having the desirable properties of high strength, rapid setting time, long working time that is independent of temperature, and negligible conversion.

For example, the inventors have found that the sulfates in the pozzolanic additive work in combination with the lithium-containing accelerator to obtain a desirable balance between a long working time and a fast setting time. In the absence of sulfates, dissolution of the lithium-containing accelerant immediately produces lithium ions, which catalyse the cementitious reaction, leading to unacceptably short working times. For the example of a lithium chloride accelerator, this dissolution can be represented as:

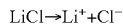

However, in the presence of sulfur salts it is believed that this dissolution reaction is interrupted, and intermediate compounds are formed prior to formation of the lithium ions. For example, in the presence of calcium sulfite the intermediate reactions may be:

The formation of lithium ions is therefore slowed by the formation of intermediate lithium compounds. This delay in producing the lithium catalyst slows the initial rate of reaction, providing a longer working time. Once the intermediate compounds have reacted to form lithium ions, the cementitious reaction is catalysed as expected, and the cementitious reaction proceeds quickly, providing a fast setting time.

The inventors have found that to obtain an optimum combination of working time and setting time, the amount of lithium-containing accelerator in the dry mix can preferably be kept below the surprisingly small proportion of approximately 0.1%, and can be as low as or lower than approximately 0.01%. This relatively low accelerant proportion has the additional advantage of keeping the cost of the dry mix low.

Conversion of the cement is minimized by the presence of the pozzolanic additive in the mix, which reduces conversion by favouring stratlingite formation in preference to the hydrogarnet phase. The inventors have found that a proportion of between approximately 20% and approximately 40% pozzolanic additive in the dry mix results in optimal reduction of conversion, and a proportion of approximately 35% is particularly advantageous.

This relatively high proportion of pozzolanic additive would ordinarily be expected to reduce the strength of the cement to unacceptably low levels. However, in the cement of the present invention the components work in synergy to increase the initial strength of the cement, so that it is higher than that of a simple calcium aluminate cement. Advantageously, therefore, the high proportions of pozzolanic additive required for lowering cost and reducing conversion do not compromise the initial strength of the cement of the invention.

The increased initial strength is believed to arise from two factors. Firstly, the inventors believe that materials present in pozzolanic additives take part in the cementitious reaction, working together with the calcium-containing and aluminum-containing materials to contribute to the increased strength of the final cement. Secondly, it is believed that the retarder acts as an activator for hydration of the pozzolanic additive, producing a cement-like product that increases strength. Thus, a synergistic interaction between the retarder and the pozzolanic additive contributes still further to the overall strength.

Thus, when a dry mix for a composite cement according to the invention is hydrated, complex synergistic reactions occur between the constituents of the mix, producing a cement having the desirable properties of i) high strength, ii) rapid set, iii) long working time that is independent of temperature, and iv) negligible conversion.

In preferred embodiments, the strength of the cement can be still further increased, by reduction of the water to dry mix ratio. This reduction in the water to dry mix ratio also reduces the degree of conversion. Since the conversion process is a hydration reaction, the lower water to dry mix ratio in the cement means that less water is available for the reaction, thereby reducing conversion of the cement.

An existing calcium aluminate cement containing a pozzolanic additive would typically use a water to dry mix ratio of approximately 0.4 to 1 by weight. A lower ratio would be expected to affect adversely the properties of the cement. By contrast, the dry mix of the present invention can be utilized with a water to dry mix ratio that is less then 0.4 to 1 by weight, without adversely affecting the properties of the cement.

One factor that typically determines the amount of water required in a calcium aluminate cement is the solubility of the calcium in the dry mixture. In the embodiment where the pozzolanic additive also contains soluble calcium, this solubility is high, meaning that less water is required in to produce the required number of calcium ions, and the water to dry mix ratio can be reduced.

A further advantage of the embodiment in which the pozzolanic additive also contains soluble calcium is that the dissolved calcium ions can contribute to the cementitious reaction, providing additional calcium ions to produce more calcium aluminate, thereby increasing the strength of the cement. The inventors believe that the excess calcium ions also promote formation of the stable stratlingite phase, thereby aiding in the reduction of the proportion of the cement that is converted from monocalcium aluminate to hydrogarnet.

In another embodiment, the water to dry mix ratio can alternatively or additionally be reduced by selecting a fly ash having a low water absorption, for example less than 1 ml of water absorbed per gram of fly ash.

The dry mix according to any previously-described embodiment may be mixed with sand and/or aggregates, so as to form a dry mix for a concrete. The dry mix for the concrete may comprise between approximately 80% and approximately 95% sand and aggregates, and between approximately 5% and approximately 20% dry mix according to any previously-described embodiment.

In accordance with another aspect of the present invention, there is provided a powdered additive including at least a pozzolanic additive that contains a soluble sulfate salt, a lithium-containing accelerant, and a retarder. Such an additive can conveniently be mixed with a pre-prepared dry mix for a calcium aluminate cement, for example a conventional dry mix for a calcium aluminate cement such as Ciment Fondu®, so as to form a dry mix for a composite cement according to the first aspect of the invention, and to which water can then be added to produce a cement.

The dry mix for the composite cement, or the additive, may be used to form other cement based materials. For example, the composite cement may be used to form a mortar, a concrete, or a thin-set binder.

In one example of the invention, the dry mix is combined with sand, cellulose, a polymer and water, to produce a thin-set mortar. The thin-set mortar may include between approximately 30% and approximately 70% sand, between approximately 30% and approximately 70% composite cement, between approximately 1% and approximately 10% polymer and between approximately 0.05% and approximately 1% cellulose. The dry ingredients are mixed with water in a mixer, such as a Hobart mixer or a planetary mixer, allowed to slake, and then mixed for a further period of time.

In a further example of the invention, the dry mix is used in the manufacture of a concrete product such as a brick, paver or tile. The concrete product may comprise between approximately 80% and approximately 95% sand and aggregates, and between approximately 5% and approximately 20 dry mix. To produce the concrete product, the dry mix form of the composite cement is mixed with sand and aggregates in a mixer such as a planetary mixer, for around 30 seconds. This dry mixture of composite cement, sand and aggregates is then mixed with water for a further two minutes, before being discharged to a holding hopper. The resultant mixture is cast in molds, and allowed to set and harden to form concrete products.

Advantageously, the fast setting time of the cement made according to the present invention means that the mixture can quickly set and harden at ambient temperatures. As a result, high temperature curing processes are not necessary to provide a concrete block, thereby saving the cost of heating curing rooms.

EXAMPLES

Examples are now provided to illustrate the invention. The samples described in these examples were produced in a laboratory. As such, it is conceivable that the equivalent materials when produced in other conditions, for example on a production line, may display properties that differ somewhat from the properties described below, but which do not affect the overall qualitative results.

All parts and percentages expressed herein are parts and percentages by weight.

Solubility tests were conducted by soaking the pozzolanic material in water at a pozzolanic material to water ratio of 100 g of material to 300 ml of demineralized water. The pozzolanic material was soaked in the water for thirty minutes, and the water was allowed to stand for an additional 10 minutes. 5 ml of water was taken from the surface of the sample, and the concentration of soluble species in the water was measured by X-ray fluorescence (XRF). The proportions of soluble materials given throughout this description refer to the concentration of the relevant species present in the water following this test, expressed as atomic percent.

Example 1

A dry mix for a composite cement was made from starting materials in the following proportions:

| Kerneos Fondu Ciment: | 211 kg |
| Class C fly ash: | 106 kg |
| Polycarboxylate: | 2.72 kg |
| LiCl: | 300 g |

The soluble sulfur salt content of the class C fly ash was measured as previously described, and the class C fly ash was found to have a sulfate solubility of 0.367%.

A dry concrete mix was made by adding 320 kg of this dry mix to 547 kg of sand and 695 kg of aggregate.

The dry mix was mixed with 25 gallons (94.6 litres) of water to produce a water to dry mix ratio of 0.29 to 1. The dry mix and aggregates were blended together with water using a volumetric mixer truck.

To determine the working time and setting time of the cement, the workability of the concrete was monitored over time. Two concrete samples were poured on the ground: the first into a 4-inch slump and the second into an 8-inch slump. The samples were exposed to ambient temperature and sunlight, and allowed to set. Qualitative observations of the workability over time were as follows:

| | Qualitative observations of workability | |
|---|---|---|
| Time/ | 4-inch slump | 8-inch slump |
| 15 | workable | workable |
| 20 | workable | workable |
| 35 | soft but not workable | — |
| 45 | — | workable |
| 55 | scratchable but not workable | — |
| 70 | — | scratchable |
| 90 | scratchable | — |

Thus, both samples displayed a working time of over twenty minutes.

To determine the initial strength of the cement, and the strength evolution over time, the compressive strength of the concrete sample cast in the 4-inch slump was measured over time, with the following results:

| Time | Strength/PSI |
|---|---|
| 3 hours | 5130 (35.37) |
| 6 hours | 5770 (39.78) |
| 28 days - | 7130 (49.16) |

To determine the degree of conversion of the concrete, and the corresponding strength drop, two 6 inch×12 inch (15 cm×30 cm) cylinders of the concrete were cast for testing. One cylinder was allowed to set under ambient conditions. The other cylinder was placed in an adiabatic box made of a cube consisting of 6-inch (15 cm) thick walls made of polystyrene that allowed all of the heat generated to be captured inside the adiabatic box. The cylinder was heated to a temperature of 165° F. (74° C.) over a period of 7 hours to completely convert the monocalcium aluminate in the cement to the stable phases including hydrogarnet.

The converted concrete sample showed a 28 day strength of 6320 PSI (44 MPa). The unconverted concrete sample showed a 28 day strength of 6740 PSI (46.5 MPa). Thus, the total strength loss due to conversion was 420 psi (3 MPa) or 6.2%.

The concrete of Example 1 therefore demonstrates the desirable properties of high strength, long working time, rapid set and a negligible degree of conversion.

Example 2

To test the effect of different proportions of lithium-containing accelerant, in this case LiCl, mortar was made from starting materials in the following quantities:

| Kerneos Fondu Ciment: | 350 g |
| Class C fly ash: | 150 g |
| ASTM C778 Sand: | 1375 g |

-continued

| | |
|---|---|
| Polycarboxylate: | 1.5 g |
| LiCl: | 0.25 g; 0.5 g; 1.0 g |
| Water: | 140 ml |

The class C fly ash was the same as that used in Example 1, having a sulfate solubility of 0.367%.

Mortars containing varying amounts of LiCl were made, using the ASTM C109 cube procedure, and were poured into two-inch (5 cm) mortar cubes. The compressive strength was measured at one-hour intervals over a three hour period with the following results:

| Time/ | Strength/PSI (Strength/MPa) | | |
|---|---|---|---|
| hours | 0.25 g LiCl | 0.5 g LiCl | 1.0 g LiCl |
| 1 | 1381 (9.52) | 1749 (12.06) | 1770 (12.20) |
| 2 | 1790 (12.34) | 2397 (16.53) | 2295 (15.82) |
| 3 | 2200 (15.17) | 2746 (18.93) | 2810 (19.37) |

It should be appreciated that various modifications and improvements can be made without departing from the scope of the invention as defined in the appended claims. For example, the pozzolanic additive need not naturally contain soluble a sulfur salts, but the pozzolanic additive may instead be provided as a pozzolanic additive to which soluble sulfur salt has been added. Similarly, soluble calcium may be added to a low-calcium pozzolanic additive or to a calcium free pozzolanic additive to provide a pozzolanic additive that contains soluble calcium. Additionally, other known additives, such as colorants, may also be added to the dry mix.

The invention claimed is:

1. A dry mix for a concrete, consisting of:
   from about 80% to about 95% by weight of sand and/or aggregates, and
   from about 5% to about 20% by weight of a dry mix for a calcium aluminate composite cement, wherein the dry mix for a calcium aluminate composite cement consists of:
   from about 0.01% to about 0.1% by weight of lithium chloride;
   from about 0.1% to about 0.5% by weight of a polycarboxylate retarder;
   from about 25% to about 40% by weight of class C fly ash, wherein the class C fly ash contains a soluble sulfur salt; and
   calcium aluminate cement.

2. The dry mix for a concrete of claim 1, wherein the class C fly ash includes a soluble sulfur salt at a fraction greater than approximately 0.2% by weight.

3. The dry mix for a concrete of claim 1, wherein the class C fly ash also contains soluble calcium.

4. The dry mix for a concrete of claim 3, wherein the class C fly ash contains soluble calcium at a fraction greater than approximately 1% by weight.

* * * * *